United States Patent Office 3,019,622
Patented Feb. 6, 1962

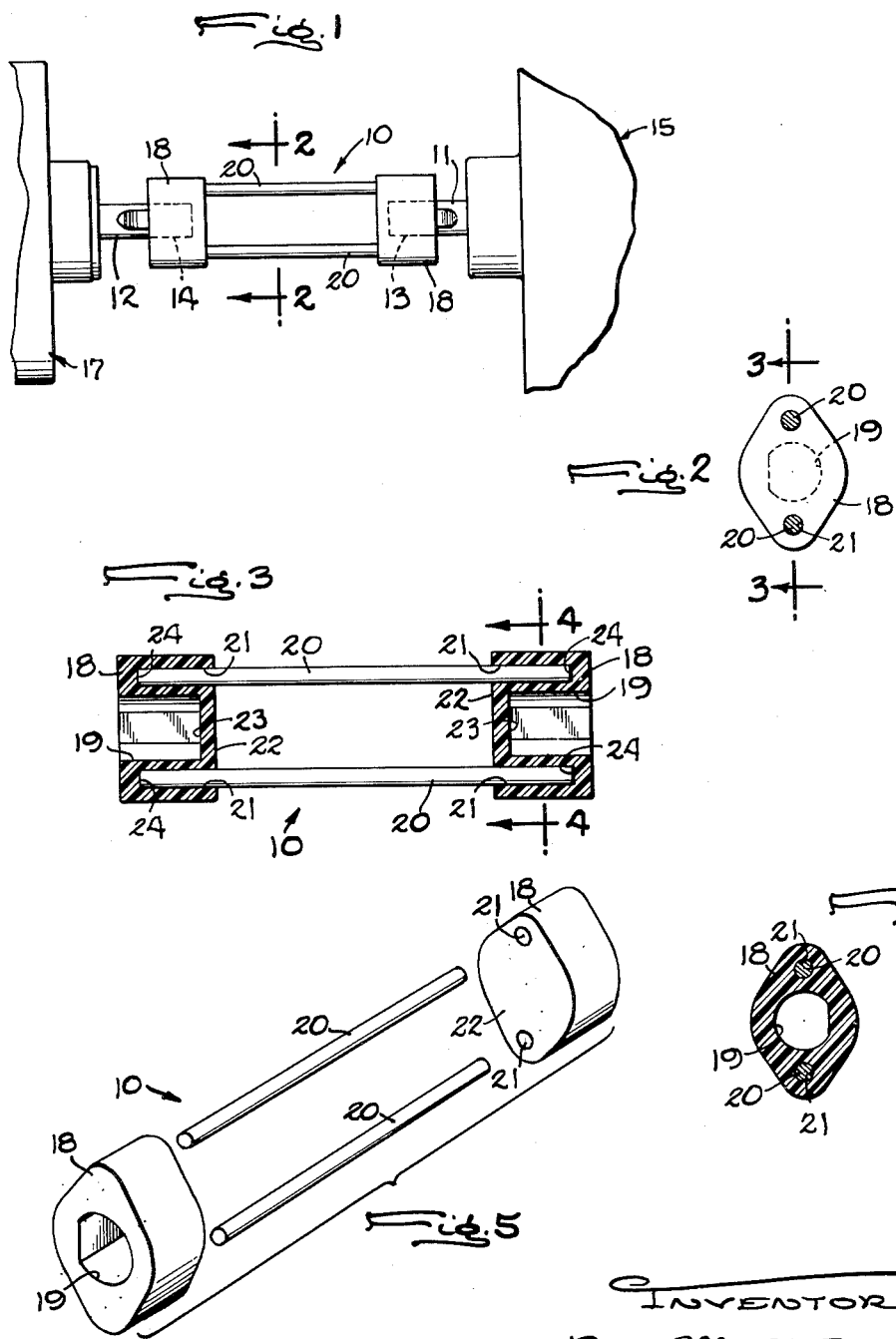

3,019,622
FLEXIBLE COUPLING
Rex M. A. Fermier, Chicago, Ill., assignor to Lovejoy Flexible Coupling Co., Chicago, Ill., a corporation of Illinois
Filed Feb. 3, 1961, Ser. No. 86,921
2 Claims. (Cl. 64—15)

This invention relates to flexible couplings for connecting the axially separated ends of two alined shafts and having heads mounted on the shaft ends and connected by angularly spaced resilient pins.

The primary object of the present invention is to provide a novel coupling of the above character which, as compared to prior couplings, is simpler in construction and may be produced at a lower cost.

Another object is to provide a coupling of the above type which is easily adaptable to different axial spacing of the coupled shafts.

Other objects and advantages will become apparent from the following detailed description taken in connection with the accompanying drawings in which FIGURE 1 is a side elevational view of a coupling embodying the novel features of the present invention.

FIG. 2 is a fragmentary sectional view taken along the line 2—2 in FIG. 1.

FIG. 3 is a fragmentary sectional view taken along the line 3—3 in FIG. 2.

FIG. 4 is a fragmentary section taken along the line 4—4 in FIG. 3.

FIG. 5 is an exploded perspective of the coupling shown in FIG. 1.

For purposes of illustration, the invention is shown in the drawings incorporated in a coupling 10 for connecting alined shafts 11 and 12 having axially separated flat-sided ends 13 and 14. In this instance, the shaft 11 is adapted to be driven by a motor 15 and the other shaft 12 drives a pump 17. The coupling 10 comprises a pair of heads 18 having flat-sided holes 19 adapted to telescope closely with the shaft ends, the heads being connected by a plurality of resilient metal pins 20, two in this instance, angularly spaced around and preferably on opposite sides of the coupling axis. The pins extend between the heads with the opposite ends of the pins snugly received in alined holes 21 in the adjacent end faces 22 of the heads to transmit torque between the shafts.

The present invention contemplates forming the pin and shaft holes in the two heads in a novel manner so that the pins 20 prevent movement of heads toward each other after the initial assembly and the heads coact with he shaft ends 13 and 14 to prevent axial shifting of the heads along the shafts and away from each other, in spite of the fact that the coupling is installed for service use simply by inserting the pins in the holes 21 and telescoping the heads onto the shaft ends. To perform these important functions, the heads are formed with stops at the inner ends of the shaft holes and also at the inner ends of the pin holes. In the casting or molding operation by which the heads preferably are formed, the stops can easily be formed integrally with the head as walls 23 and 24 closing the holes.

To assemble the coupling 10, the opposite ends of each pin 20 are inserted in corresponding holes 21 in the heads 18 and the heads are mounted on the adjacent ends of the shafts as the motor 15 and pump 17 are being installed. When the motor and pump are secured on their mountings, the coupling is held together and in place by the positioning of the shafts 11 and 12 with the end walls 23 of the shaft holes abutting against the ends of the shafts to limit axial separation of the heads, and the end walls 24 of the pin holes abutting against the ends of the pins to limit sliding of the heads toward each other.

Thus, the coupling requires only the heads 18 and the pins 20. For maximum economy of manufacture, the heads may be mass produced as by molding of a suitable plastic with high wear resistance characteristics such as nylon or Delrin.

It will be apparent that the axial length of the coupling may be adapted for different axial spacing of the shafts to be coupled simply by substituting pins of different lengths. Preferably, however, the heads are spaced apart a substantial distance, that is one-half inch or more, so that the pins are subjected to torsional stress rather than to shear. Since the ultimate strength in torsion of spring wire is substantially greater than the modulus of elasticity in shear, lighter pins may be used for a particular application when the heads are spaced more than one-half inch apart. In the coupling shown herein, only two pins are utilized to transmit torque between the heads. By increasing the number of pins, however, or by increasing the diameter of the pins, the torsional stiffness of the coupling may be increased as desired.

From the foregoing, it will be seen that the parts of the coupling 10 remain in proper positions relative to each other and to the shafts in spite of vibration and reversing torques to which the coupling may be subjected in service use. With stops formed in the pin holes and in the shaft holes, the coaction of the shafts with the heads limits the sliding of the latter along the shafts. The pins, in addition to transmitting torque between the heads, coact with the stops 24 to perform the further function of limiting sliding of the heads together. Because of this extremely simple construction, the cost of the novel coupling is much lower than the cost of prior couplings.

I claim as my invention:

1. A coupling for connecting the flat-sided axially separated ends of two alined shafts, said coupling comprising a head having a flat-sided shaft hole in one face and a plurality of angularly spaced pin holes in the opposite face, said shaft hole being adapted to telescope with one of the shafts, a similar head telescoping with the other shaft and having pin holes alined with said pin holes in said first head, a plurality of pins extending between said heads with the opposite ends of each pin projecting into said alined holes to transmit torque between the heads, a stop formed in each of said shaft holes, said stops abutting against the ends of the shafts and limiting the sliding of said heads apart along the shafts, and stops formed in said pin holes and abutting against the ends of said pins to limit sliding of the heads toward each other.

2. A coupling as defined in claim 1 in which said stops are formed by walls integral with said heads and defining the inner ends of said shaft and pin holes.

No references cited.